United States Patent
Rached et al.

(10) Patent No.: US 6,713,540 B2
(45) Date of Patent: Mar. 30, 2004

(54) METHOD FOR CROSSLINKING ASPHALT COMPOSITIONS AND THE PRODUCT RESULTING THEREFROM

(75) Inventors: Moises Cisneros Rached, Houston, TX (US); Edward Mazzone, Dickinson, TX (US); Maria Grazia Cabvaliere, San Donato Milanese (IT)

(73) Assignee: Polimeri Europa Americas, Inc., Houston, TX (US)

( * ) Notice: Subject to any disclaimer, the term of this patent is extended or adjusted under 35 U.S.C. 154(b) by 81 days.

(21) Appl. No.: 10/092,629

(22) Filed: Mar. 8, 2002

(65) Prior Publication Data

US 2003/0171460 A1 Sep. 11, 2003

(51) Int. Cl.$^7$ ................................................ C08L 95/00
(52) U.S. Cl. .............................. 524/68; 524/59; 524/70; 524/71
(58) Field of Search ............................. 524/59, 68, 70, 524/71

(56) References Cited

U.S. PATENT DOCUMENTS

| | | | | | |
|---|---|---|---|---|---|
| 3,963,659 | A | * | 6/1976 | Binder et al. | 524/70 |
| 5,256,710 | A | * | 10/1993 | Krivohlavek | 524/59 |
| 5,428,085 | A | * | 6/1995 | Burel et al. | 524/59 |
| 6,414,056 | B1 | * | 7/2002 | Puzic et al. | 524/59 |

* cited by examiner

*Primary Examiner*—Peter Szekely
(74) *Attorney, Agent, or Firm*—Oblon, Spivak, McClelland, Maier & Neustadt, P.C.

(57) ABSTRACT

A process is provided for crosslinking polymer modified asphalt compositions using a combination of a crosslink initiator, crosslink co-agent and crosslinkable polymer, to provide a process that is more reliable and more reproducible and that gives products that have a combination of properties that are superior to conventional sulfur crosslinked compositions.

23 Claims, 1 Drawing Sheet

Creep Test / At 40°C, 500 Pa/ 9% Polymer
Phase separation graph after ageing in oven at 190°C, 48 hrs.

METHOD FOR CROSSLINKING ASPHALT COMPOSITIONS AND THE PRODUCT RESULTING THEREFROM

BACKGROUND OF THE INVENTION

1. Field of Invention

The present invention relates to methods for crosslinking asphalt compositions and the improved crosslinked products resulting therefrom.

2. Discussion of the Background

The use of sulfur as an agent for crosslinking of SBR (Styrene Butadiene Rubber) and SBS (Styrene Butadiene Styrene block copolymers) in asphalt blends and the technical advantages derived from this process are well known in the industry. The main advantages are:

a) Polymer Stability

Both families of polymers provide an improvement in polymer stability, thereby preventing asphalt-polymer phase separation very efficiently.

b) Improvement in Blend Physical Properties

The weak physical properties obtained with SBR are highly improved by sulfur crosslinking. The use of non-crosslinked SBS in asphalt production immediately provides medium to strong physical properties. However, even in this particular case, the use of sulfur crosslinking produces a small to medium improvement in physical properties (particularly in softening point and penetration).

c) Low Temperature Performance

The use of crosslinking agents modifies the low temperature performance of the asphalt, making the asphalt more elastic at this condition. The resulting asphalt is softer, easier to deform and recovers more readily from applied stress at low temperatures. At the same time, at high temperature, the asphalt is not softer, provides better resistance to deformation and recovers more readily.

Sulfur is widely used as a crosslinking agent in SBR and low molecular weight, linear SBS, but is restricted with high molecular weight, radial SBS. This restriction on the use of sulfur as a crosslinking agent with radial, high molecular weight SBS is mainly due to the following:

High levels of sulfur addition are not allowed. The process is highly sensitive to sulfur concentration. Additions above 0.025% per each polymer percent produces gels with disastrous consequences, making the process too vulnerable in the event of a sulfur addition mistake.

Medium addition of sulfur in the order of 0.014 to 0.024% produces unpredictable results. Due to this unpredictability in this concentration range, the use of the same concentration of sulfur sometimes permits the process to run well, while at other times the polymer undergoes overcrosslinking and produces gels, thus increasing the risk when the concentration is higher but not eliminating the risk when the concentration is lower, in this medium range.

Low concentrations of sulfur in the order of 0.013% or lower per each percent of polymer is likewise unpredictable, with a given percentage sometimes producing good results, while at other times there is no reaction at all.

All these variations can occur unpredictably, even though the quality of the raw material and the process conditions remain constant. The variation is believed to be primarily related to a lack of repeatability inherent to the sulfur crosslinking process when it is used in radial, high molecular weight SBS.

To avoid these drawbacks, some producers use very low additions of 0.009% of sulfur or lower and set the polymer modified asphalt in storage at high temperature for more than 3 days. While this procedure avoids overcrosslinking, the most disastrous outcome, it still provides a high degree of variability in the resulting product. Low additions of sulfur, as low as 0.009%/% of polymer and a further storage up to three days at high temperature might reduce the overcrosslink risk but still delivers variable results.

SUMMARY OF THE INVENTION

Accordingly, one object of the present invention is to provide a process for crosslinking polymer modified asphalt compositions that gives improved reliability for the process and improved reproducibility.

A further object of the present invention is to provide a process for crosslinking polymer modified asphalt compositions that is easier to control and that provides a product that has a combination of properties that is similar to or better than conventional sulfur crosslinked asphalt compositions.

A further object of the present invention is to provide a crosslinked polymer modified asphalt composition that can be readily produced and has properties that are comparable to or even better than conventional sulfur crosslinked asphalt compositions.

These and other objects of the present invention have been satisfied by the discovery of a process for preparation of a crosslinked asphalt composition, comprising:

heating an asphalt composition at a first temperature of from 250° F. (121° C.) to 430° F. (221° C.), in the presence of a) a crosslinkable polymer and b) a crosslink co-agent;

adding a crosslinking initiator at a temperature of from 360° F. (182° C.) to 430° F. (221° C.); and agitating the resulting mixture at a temperature at from 360° F. (182° C.) to 410° F. (210° C.) for a period of time sufficient to complete crosslinking, and the crosslinked asphalt compositions resulting therefrom.

BRIEF DESCRIPTION OF THE FIGURE

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
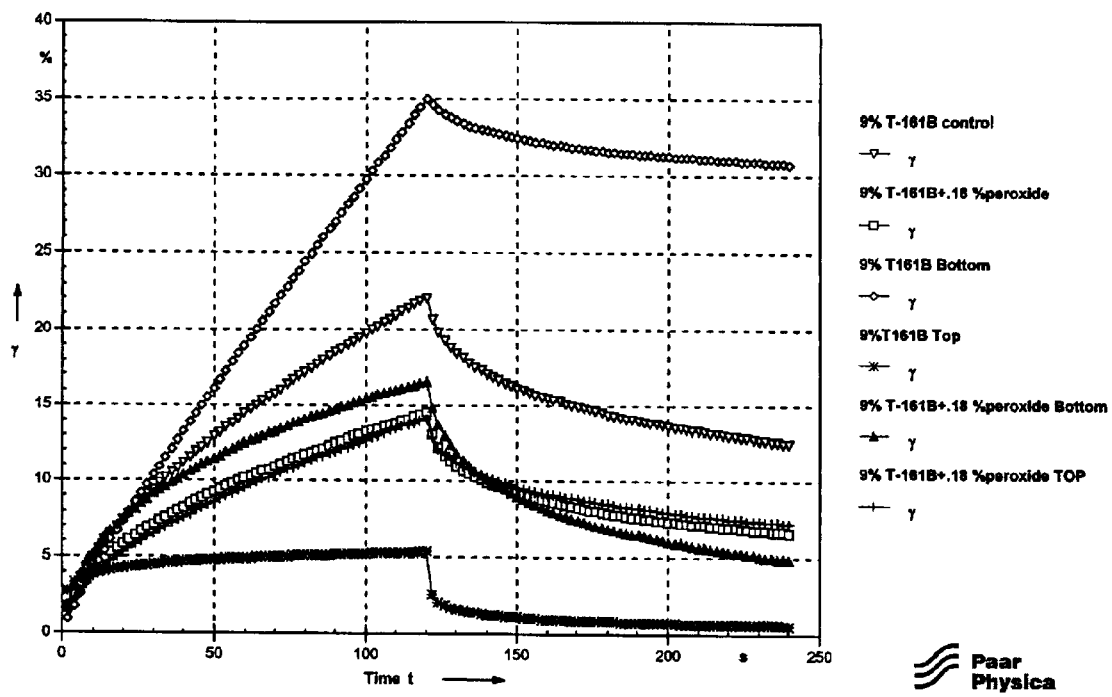
FIG. 1 is a graphical representation showing creep test results performed on samples of the present invention compared to conventional asphalt compositions, showing the improved storage stability of the present invention compositions.

The present invention relates to a process for improving polymer modified asphalt performance comprising:

heating an asphalt composition at a first temperature of from 250° F. (121° C.) to 430° F. (221° C.), in the presence of a) a crosslinkable polymer and b) a crosslink co-agent;

adding a crosslinking initiator at a temperature of from 360° F. (182° C.) to 430° F. (221° C.); and agitating the resulting mixture at a temperature of from 360° F. (182° C.) to 410° F. (210° C.) for a period of time sufficient to complete crosslinking, and the crosslinked asphalt compositions resulting therefrom.

The present invention further relates to a final product that has:

1. Better high temperature properties (at temperatures higher than 68° F. (20° C.)) represented by higher softening point, higher deformation resistance and higher recovery under stress
2. Better performance at low temperature (32° F. (0° C.) and lower) represented by higher flexibility, higher deformation and higher recovery.
3. Better stability represented by lower polymer phase separation, in the final asphalt mixture, during storage at normal and high temperatures (270° F. (132° C.) and above).

The present invention method provides improvement in the efficiency of the crosslinking process when using crosslinking agents, such as an organic peroxide free radical initiator, sulfur or sulfur donors, in asphalt mixtures with crosslinkable polymers, such as SBR, SBS and other polymers with vulcanization capabilities. Within the context of the present invention, the use of the term "sulfur" is intended to include both elemental sulfur as well as compounds that act as sulfur donors. Any type of asphalt composition can be used, so long as it is crosslinkable. Preferred asphalt compositions include, but are not limited to, asphalts AC2.5 to AC 40, and also asphalt flux, with AC20 being most preferred. Representative asphalt compositions are detailed in the following table:

addition of crosslink co-agent or crosslinking accelerator may be done simultaneously with the polymer. The polymer addition is preferably performed at a maximum temperature of 392° F. (200° C.). Accordingly, the polymer addition is preferably performed in the temperature range of from 320° F. (160° C.) to 392° F. (200° C.).

After complete dissolution of polymer, the crosslinking initiator is preferably added at a temperature from 356° F. (180° C.) to 392° F. (200° C.), more preferably from 356° F. (180° C.) to 374° F. (190° C.).

Agitation is maintained at a temperature from 356° F. (180° C.) to 392° F. (200° C.), preferably from 374° F. (190° C.) to 392° F. (200° C.) during according to one of the following two options:

Option one: Agitation is maintained for a period of time sufficient to complete the reaction of the crosslinking initiator, preferably 30–60 minutes, more preferably about 45 minutes, particularly with peroxide crosslink initiators. The process is then complete, or can continue with the following sub-option one.

Sub-option one: A subsequent addition of sulfur can be done after crosslinking, either immediately after crosslinking, or at a time up to 90 days after crosslinking. When using this embodiment, during that time, the crosslinked asphalt composition is preferably placed in storage to maintain properties at the same level reached at the end of option one. The resulting mixture is preferably heated to a temperature from 320° F. (160° C.) to 392° F. (200° C.), more preferably 320° F. (160° C.) to 356° F. (180° C.). The sulfur is then added and agitation maintained for a

| Asphalt Cement Specification Viscosity Graded at 140° F. (60° C.)' (Grading Based on Original Asphalt) | | | | | | |
|---|---|---|---|---|---|---|
| Test | | | | | | |
| Viscosity Grade | AC-2.5 | AC-5 | AC-10 | AC-20 | AC-30 | AC-40 |
| Viscosity, 140° F. (60° C.)P | 250 +– 50 | 500 +– 100 | 1000 +– 200 | 2,200 +– 400 | 3,000 +– 600 | 4,000 +– 800 |
| Viscosity, 275° F. (135° C.), min, cSt | 125 | 175 | 250 | 300 | 350 | 400 |
| Penetration, 77° F. (25° C.), 100 5 min g, s, | 220 | 140 | 80 | 60 | 50 | 40 |
| Flash point, (Cleveland open cup), min, ° F. (° C.) | 325(163) | 350(177) | 425(219) | 450(232) | 450(232) | 450(232) |
| Solubility in trichloroethylene, min, percent | 99 | 99 | 99 | 99 | 99 | 99 |
| Tests on residue from thin-film oven.test Viscosity, 140' F. (60" C.), max, P | 1250 | 2500 | 5000 | 10000 | 15000 | 20000 |
| Ductility, 77' F. (25" C.), 5 cm/min, min, cm | 10000 | 100 | 75 | 50 | 40 | 25 |

In the first step of the present invention process, the asphalt is heated in a temperature range from 250° F. (121° C.) to 430° F. (221° C.), preferably from 284° F. (140° C.) to 320° F. (160° C.). The heated composition is also agitated, with the agitation preferably beginning at a temperature sufficient to allow agitation to occur. The addition of crosslink co-agent or crosslinking accelerator, or both, can be done optionally during this first step or in step two as convenient, preferably during this step.

In either embodiment, if crosslink co-agent or crosslinking accelerator addition is done in step one or step two, it is preferably done at a temperature in the range from 250° F. (121° C.) to 320° F. (160° C.), most preferably from 293° F. (145° C.) to 320° F. (160° C.).

The addition of polymer into the asphalt is then initiated, preferably at a temperature of 320° F. (160° C.) or above. If polymer addition is begun at a lower temperature, the time sufficient to complete the reaction, preferably a minimum of 45 minutes, to complete the process.

Option two: In this alternative embodiment, the agitation is continued for a period of time sufficient to let the crosslinking reaction advance in a range from 20 minutes to 45 minutes, preferably from 25 to 30 minutes, most preferably 30 minutes. After this; sulfur addition is carried out. The mixture is then maintained under agitation for a period of time sufficient to complete the reaction, preferably a minimum of 30 minutes after sulfur addition, at temperatures from 356° F. (180° C.) to 392° F. (200° C.), preferably from 374° F. (190° C.) to 392° F. (200° C.), to complete the process.

The present invention uses a selective crosslink co-agent (that preferably acts as an accelerator) that has more chemical affinity for the polymers, particularly with the styrene block polymer section, than with the asphalt components, thereby increasing the efficiency of crosslinking of the polymer in the asphalt vs the whole asphalt mixture.

The polymers used in the present invention are any (co)polymer that is crosslinkable and provides improvements in the properties of asphalt once crosslinked. As used herein, the term "(co)polymer" means that the polymer can be a homopolymer or copolymer, with the copolymer being any type of copolymer, including but not limited to, random, block, gradient, radial and star copolymers, as well as combinations thereof. Preferred (co)polymers are those having styrene and conjugated diene units, particularly polystyrene and polybutadiene blocks. More preferred polymers include, but are not limited to, styrene-butadiene based copolymers such as SBR and SBS, as well as polybutadiene (BR) itself. Most preferred is the use of radial, high molecular weight SBS. These polymers can be described with a general structure of (SB)n, with n>2. The weight average molecular weight, Mw, is preferably 150,000 or more, preferably 200,000 or more, most preferably about 240,000. Within the present invention, use of the term "about" with respect to Mw indicates a measured or reported Mw rounded to the nearest 10,000. The polymers are used in an amount of from 0.1 to 20 wt %, preferably from 0.5 to 15 wt %, more preferably from 1 to 12 wt %, based on total composition weight.

The selective crosslink co-agent of the present invention can be any compound having greater affinity for the polymer than for the asphalt itself, and provides an increase in the efficiency of crosslinking. Preferably, the co-agent provides an acceleration of the crosslinking of the polymers. Preferred crosslink co-agents are those co-agents that have a boiling point above 212° F. (100° C.). More preferably, this boiling point should not be lower than 250° F. (121° C.), the lower temperature of the first step, permitting them to stay in the reaction mixture longer under the extreme heating conditions of the crosslinking reaction. More preferred co-agents are one or more members selected from the group consisting of dimaleimide compounds and cyanurate compounds. Most preferred co-agents are one or more members selected from the group consisting of phenylenedimaleimide, triallyl cyanurate, and isocyanurate. The crosslink co-agent is used in an amount sufficient to increase the crosslinking efficiency, preferably from 0.01 to 0.3 wt %, more preferably from 0.02 to 0.025 wt %, most preferably 0.020 wt %, per each 1 wt % of polymer present in the asphalt mixture, wherein the weight percentages are calculated based on total composition weight. For example: if 9 wt % of polymer is used and 0.020% of co-agent per 1 wt % of polymer is selected, the total percentage of co-agent in the total composition would be 0.020*9=0.18%.

The present invention uses a combination of the crosslink co-agent and a crosslink initiator. Preferred crosslink initiators include, but are not limited to, organic peroxides, sulfur and sulfur donor compounds.

Suitable peroxide type initiators include, but are not limited to, di(2-tert-butylperoxy-isopropyl)benzene, 1,5-diethyl-2,5-di-(tert-butyl-peroxy)-hexyne, tert-butyl cumyl peroxide, dicumyl peroxide, 1,5-dimethyl-2,5-di (tert-butyl-peroxy)-hexane, di-(2-tert-butylperoxypropyl-(2))-benzene, n-Butyl 4,4-di (tert-butylperoxy)-valerate, and 1-di (tert-butylperoxy)-3,3,5-trimethylcyclohexane. Suitable sulfur donor compounds include, but are not limited to 4,4'-dithiodimorpholine, thioacetamide, thiazole, sulfenamide, dithiocarbamates, xanthates, and thiurams.

The crosslink initiator, particularly the peroxide-based free radical crosslinking agents, is used to initiate the crosslinking reaction of the polymers. The crosslink initiator is used in amounts customary in the industry for crosslinking the particular polymer chosen. Preferably, the initiator is used in an amount of from 0.02 to 0.30 wt %, more preferably from 0.022 to 0.025 wt %, most preferably 0.025 wt %, per each 1 wt % of polymer present in the asphalt composition. For example: if 9 wt % of polymer is present in the asphalt composition and 0.025 wt % of initiator per 1 wt % of polymer is selected, the total percentage of initiator would be 0.025*9=0.225% based on total asphalt composition.

The sulfur is used in an amount sufficient to complete the crosslinking reaction, preferably from 0.01 to 3.0 wt %, more preferably from 0.012 to 0.025 wt %, most preferably 0.013 wt %, per each 1 wt % of polymer present in the asphalt composition. For example: if 9 wt % of polymer is present in the asphalt composition and 0.013 wt % of sulfur per 1 wt % of polymer is chosen, the total percentage of sulfur would be 0.013*9=0.117 wt % based on total asphalt mixture.

The action of the coagent (or accelerator), allows the use of a less reactive peroxide free radical crosslinking initiator. The present process preferably uses peroxides that are reactive at elevated temperatures, more resistant to decomposition, degradation and safer in storage and handling. The use of sulfur is also more effective during this process due to the selective effect of the co-agent, assisting the crosslinking process to occur in the polymer rather than on the double bonds of the asphalt components.

In the process of the present invention, the order of addition of the ingredients is not particularly limited. From a materials handling aspect, it is preferred to add the co-agent, initiator and polymer to the asphalt composition, although it is possible to premix one or more of the polymer, co-agent and initiator, then add the asphalt composition to it. In a preferred embodiment, the asphalt is brought up to the desired temperature of from 250° F. (121° C.) to 430° F. (221° C.), followed by addition of the crosslinkable polymer. The co-agent is then added to the mixture at a temperature of 320° F. (160° C.) or less. The temperature is then increased to about 360° F. (182° C.), followed by addition of the initiator. The temperature is then maintained in a range of from 360° F. (182° C.) to 410° F. (210° C.), while the mixture is agitated. The agitation can be performed by any conventional means, such as a stirrer or paddle, a rotating reactor with baffles, etc. The agitation is permitted to proceed until the crosslinking reaction has occurred, preferably from 15–100 min, more preferably from 30–75 min, most preferably about 45 minutes.

In a further embodiment, the co-agent can be present in the asphalt prior to addition of the polymer, and, if desired, prior to heating of the asphalt composition. The polymer is then added, along with the initiator, preferably after the temperature reaches about 360° F. (182° C.). The mixture is then agitated as noted above.

In an additional embodiment, both peroxide type initiator and sulfur or sulfur donor compounds are used. In particular, following the crosslinking reaction using the peroxide type initiator, the resulting mixture is further allowed to react with added sulfur or sulfur donor. Using this embodiment, the reaction is further improved in reliability, repeatability (consistency of performance), and reduced in the tendency to form asphalt gels.

The product produced by the present invention process is a crosslinked asphalt composition comprising:

a) an asphalt or asphalt cement composition (within the context of the present invention, the term "asphalt" is intended to include asphalt compositions, i.e. neat asphalt, and asphalt cement compositions, i.e. asphalt plus additives ready for use on a road), b) a crosslinked polymer, wherein the crosslinks contain residues from a crosslink co-agent, preferably selected from dimaleimide compounds and cyanurate compounds, and further containing one or more residues from a crosslink initiator.

Preferably, the product comprises:

a) 85 to 98 wt. % asphalt composition
b) 1 to 12 wt. % crosslinkable polymer
c) 0.02 to 0.25 N,N'-m-phenylenedimaleimide or 0.01 to 0.30 wt % Triallyl Cyanurate
d) Free radical initiator (elevated temperature type) such as di(2-tert-butylperoxy-isopropyl)benzene or 0.02 to 3 wt % elemental sulfur or sulfur donor.

The present invention method provides a more reliable, less concentration sensitive, more repeatable crosslinking process for polymer containing asphalt composition, particularly for asphalt compositions containing SBS high molecular weight radial polymers such as Europrene SOL T161B, from now on reported as T161B.

The present process is a better crosslinking process for this type of system, not only because it is more reliable but also because it produces similar or better results in final properties, with better overall final properties and performance than using conventional sulfur only crosslinking.

Having generally described this invention, a further understanding can be obtained by reference to certain specific examples which are provided herein for purposes of illustration only and are not intended to be limiting unless otherwise specified.

EXAMPLES

In order to show some of the significant improvements obtained in the products and process of the present invention, the following experiments were performed.

a) High temperature deformation resistance (Internal EniChem method, performed on a Paar Physica Rheometer DSR 4000 SN329231, working in torsion and adopting a parallel plate geometry. The test consists in deforming the sample with a constant load (500 Pa) and following the resulting deformation after 240 s at 104° F. (40° C.))

b) Recovery after high temperature deformation (After the deformation step described in a), the load is removed and the material recovers. The recovery is measured after 240 s)

c) Elasticity at low temperature (Same method as A, but at 41° F. (5° C.))

d) Recovery after deformation at low temperature. (same method as b), but at 41° F. (5° C.)

e) Brookfield viscosity at different temperature (ASTM D4402-87)

f) Softening point (ASTM 36-86)

g) Cone penetration (ASTM D-5-86)

h) Storage stability ("Tuben test", 72 h at 180° C.?)

The tests were run under the following constant conditions: 9% polymer concentration, SBS polymer (T161B, radial structure, 30 % of styrene, 240.000 daltons molecular weight), same AC20 asphalt lot Asphalt compositions were prepared using the following crosslinking initiators, and co-agents, in the noted amounts:

1) No crosslink agent. Sample identified as CONTROL, T161B direct addition.

Asphalt AC-20 (455 g) was heated up to 160° C., followed by addition of 45 g of T161 B directly to the asphalt. Heating was continued under agitation for 45 minutes at temperatures between 180–200° C.

2) Addition of 0.014% sulfur per each polymer percent. Sample identified as SULFUR. This is a second control used as a reference even though the process is not viable at commercial scale due to the inconveniences previously mentioned.

Asphalt AC-20 (455 g) was heated up to 160° C., followed by addition of 45 g of T161 B directly to the asphalt. Heating was continued under agitation for 45 minutes at temperatures between 180–200° C. After complete polymer dissolution, 0.63 g of sulfur were added at 190° C. The resulting mixture was maintained under agitation at temperatures from 180 to 200° C. during 45 minutes until complete sulfur reaction.

3) Addition of 0.014% peroxide per each polymer percent. Sample identified as Peroxide. The peroxide used was Perkadox type 14-40B-pd (di-(tertbutylperoxyisopropyl) benzene) in all cases.

Sample prepared using the above noted procedure.

4) Addition of 0.014% peroxide and 0.014% coagent. Sample identified as PEROXIDE+CO-AG. The coagent use in this case was Perkalink 300 (triallyl cyanurate).

Sample prepared using the above noted procedure.

5) Addition of 0.014% peroxide and 0.014% of a second coagent. Sample identified as PEROXIDE+CO-AG2. The coagent used was HVA-2 (N,N m-phenylenedimaleimide).

Sample prepared using the above noted procedure.

6) Addition of 0.028% peroxide and 0.028% coagent. Sample identified as DOUBLE PEROXIDE+CO-AG. The peroxide and coagent were the same as case d). This experiment shows the sensitivity of the process to concentration changes in the crosslink initiator and co-agent.

Sample prepared using the above noted rocedure.

First Properties to be Assessed were:

a) High temperature deformation resistance
b) Recovery after high temperature deformation
c) Elasticity at low temperature
d) Recovery after deformation at low temperature since, ideally, one desires a material that has the best balance of low deformation at high temperature, high recovery at both high and low temperature and remains elastic at low temperature.

The results obtained are reported in table 1.

TABLE 1

|  |  | Control | Sulfur | Peroxide | Peroxide + Co-ag. | Peroxide + Co-ag2. | Double Perox + Co-ag. |
| --- | --- | --- | --- | --- | --- | --- | --- |
| High T deformation | % | 24 | 17.5 | 16.5 | 16.5 | 14 | 18 |
| High T recovery | % | 50 | 71 | 58 | 70 | 50 | 67 |

TABLE 1-continued

|  |  | Control | Sulfur | Peroxide | Peroxide + Co-ag. | Peroxide + Co-ag2. | Double Perox + Co-ag. |
|---|---|---|---|---|---|---|---|
| Low T deformation | % | 0.11 | 0.10 | 0.14 | 0.11 | 0.09 | 0.13 |
| Low T recovery | % | 56 | 54 | 64 | 67 | 59 | 70 |

The same results are presented below in Table 2, with each of the samples listed in order of their performance on the particular property of that column. In this format, the identification of the samples offering the best compromise between high and low temperature performance is easier. The improvement obtained when using peroxide based crosslinking system is highlighted.

TABLE 2

TABLE OF SAMPLE RANKINGS FOR EACH PROPERTY

| RANK | HIGH TEMP. DEFORMATION RESISTANCE | HIGH TEMP. RECOVERY | LOW TEMPERATURE ELASTICITY | LOW TEMPERATURE RECOVERY |
|---|---|---|---|---|
| 1ST | PEROXIDE + CO-AG2: 14% | SULFUR: 71% | PEROXIDE: 0.14% | DOUBLE PEROXIDE: 70% |
| 2ND | PEROXIDE + CO-AG., PEROXIDE | PEROXIDE + CO-AG.: 70% | DOUBLE PEROXIDE; 0.13% | PEROXIDE + CO-AG.: 67% |
| 3RD | 16.5% | DOUBLE PEROXIDE: 67% | CONTROL, PEROXIDE + CO-AG.: | PEROXIDE: 64% |
| 4TH | SULFUR: 17.5% | PEROXIDE: 58% | 0.11% | PEROXIDE + CO-AG2: 59% |
| 5TH | DOUBLE PEROXIDE: 18% | CONTROL, PEROXIDE + CO-AG2: | SULFUR: 0.10% | CONTROL: 56% |
| 6TH | CONTROL: 24% | 50% | PEROXIDE + CO-AG2: 0.09% | SULFUR: 54% |

The other properties evaluated are summarized in table 3:

TABLE 3

SUMMARY TABLE OF RESULTS OBTAINED

|  |  | Control | Sulfur | Peroxide | Peroxide + Co-ag. | Peroxide + Co-ag2. | Double Perox + Co-ag. |
|---|---|---|---|---|---|---|---|
| Softening Point | °C. | 102 | 107 | 107 | 107 | 100 | 107 |
| Pen at 25° C. | dmm | 36 | 36 | 46 | 42 | 35 | 42 |
| Brookfield Visc @ |  |  |  |  |  |  |  |
| 135° C. | cP | 9500 | 20000 | 16100 | 16700 | 14800 | 19500 |
| 160° C. | cP | 1950 | 4300 | 2980 | 3000 | 2870 | 3300 |
| 180° C. | cP | 1040 | 1850 | 1430 | 1480 | 1380 | 1500 |
| 190° C. | cP | 825 | 1400 | 1020 | 1060 | 1020 | 1040 |
| 200° C. | cP | 650 | 1120 | 775 | 850 | 775 | 800 |

1) Brookfield Viscosity at Different Temperatures.

At the low temperature of 275° F. (135° C.) the viscosity of neat asphalt AC20 is 410 cps, the viscosity of polymer modified asphalt (same AC20) with 9% T161 B is 9500 cps. These viscosities are typical of this type of blend. The viscosity after sulfur crosslinking rose to 20000 cps. The viscosity range using the different peroxide embodiments above were from 14800 to 19500 cps. The increase in viscosity from 9500 to these levels is evidence that the chemical crosslinking process has occurred.

The data at 320° F. (160° C.) viscosities are in three different levels. The first, lowest level is that for direct mix (containing essentially no-crosslinking). The second level is for the compositions using a peroxide crosslinking agent. The third and highest viscosity level was for compositions using a sulfur crosslinking agent. The second level compositions (peroxide crosslinks) were found to be approximately 67% higher than the first (uncrosslinked) compositions on average and approximately 30% lower than the third compositions (sulfur crosslinks) on average. This indicates that the crosslink density of the peroxide crosslink compositions was lower than that of the sulfur crosslink compositions.

At 392° F. (200° C.) there are also three viscosity levels. The second level (peroxide crosslink compositions) was 20% higher than direct mix (non-crosslink) compositions and 31% lower than sulfur crosslink compositions on average.

At these high temperatures and above, polymer modified asphalt has to be near the isoviscosity plateau. Data confirm that the peroxide crosslink compositions have lower crosslink density than the sulfur crosslink compositions, while having a chemical bonding that is more complex than the direct mix or non-crosslinked compositions.

2) Softening Point.

The use of sulfur in T161B improved the softening point by 9° F. (5° C.) from initial 216° F. (102° C.) obtained by direct addition of 9% T161B in asphalt type AC20. The use of peroxide co-agent improved the softening point in the same proportion as sulfur, except in the case of Peroxide plus Coagent 2 (HVA-2) where the softening point was two degrees C. lower than the original (CONTROL).

3) Cone Penetration at 77° F. (25° C.)

Sulfur co-agent had no effect on penetration while peroxide co-agent tended to increase penetration values from 35 dmm obtained on direct T161B addition, to values from 35 to 45 dmm.

4) Storage Stability

Storage stability was determined by measuring phase separation as determined using a Creep Test at 40° C., 500 Pa/9% Polymer. The phase separation obtained is shown in FIG. 1. In the graph, the bigger the difference between samples labelled top and bottom for a given specimen, represent the worst phase separation. As can be clearly seen, the stability with the Polymer modified asphalt composition of the present invention (using a peroxide crosslink) was very good and significantly better than the control sample.

5) Effects on SHRP Test

Sulfur crosslinking co-agent, as well as peroxide co-agent, have no significant effect on SHRP (Superior Highway Research Program) test original and RTFO (Rolling Thin Film Oven). Both crosslinking processes gave medium to low impact in pressure aging vessel dynamic shear rheometer (PAV DSR) results.

The improvement is really important in bending beam rheometer (BBR) results where normally a direct addition does not pass low temperature gradation. Both the sulfur crosslink co-agent compositions and the peroxide crosslink co-agent compositions gave improvements of one or two low temperature gradations on the SHRP scale.

Obviously, additional modifications and variations of the present invention are possible in light of the above teachings. It is therefore to be understood that within the scope of the appended claims, the invention may be practiced otherwise than as specifically described herein.

What is claimed is:

1. A process for preparation of a cross linked asphalt composition, comprising:

heating an asphalt composition at a first temperature of from 250 (121° C.) to 430° F. (221° C.), in the presence of a) a crosslinkable polymer and b) a crosslink co-agent;

adding a crosslinking initiator at a second temperature of from 356° F. to 430° F.; and agitating the resulting mixture at a temperature of from 360 to 410° F. for a period of time sufficient to complete crosslinking.

2. The process as claimed in claim 1, wherein said crosslinkable polymer is a member selected from the group consisting of (co)polymers containing styrene units and/or butadiene units.

3. The process as claimed in claim 2, wherein said crosslinkable polymer is a member selected from the group consisting of polymers containing polystyrene blocks and/or polybutadiene blocks.

4. The process as claimed in claim 3, wherein said crosslinkable polymer is a member selected from the group consisting of Styrene Butadiene Rubber (SBR), Styrene Butadiene Styrene (SBS) and Polybutadiene (BR).

5. The process as claimed in claim 4, wherein said crosslinkable polymer is an SBS radial polymer having a weight average molecular weight of at least 150,000.

6. The process as claimed in claim 1, wherein said crosslink co-agent is a compound having a boiling point above 212° F. (100° C.) and having a greater affinity to react with the crosslinkable polymer than with the asphalt composition.

7. The process as claimed in claim 6, wherein said crosslink co-agent is a member selected from the group consisting of dimaleimide compounds and cyanurate compounds.

8. The process as claimed in claim 7, wherein said crosslink co-agent is a member selected from the group consisting of phenylenedimaleimide, triallyl cyanurate and isocyanurate.

9. The process as claimed in claim 1, wherein said crosslink initiator is a member selected from the group consisting of organic peroxides, sulfur and sulfur donor compounds.

10. The process as claimed in claim 9, wherein said crosslink initiator is a member selected from the group consisting of di-(tert-butyl peroxyisopropyl)benzene, 1,5-diethyl-2,5-di-(tert-butyl-peroxy)-hexyne, tert-butyl cumyl peroxide, dicumyl peroxide, 1,5-dimethyl-2,5-di (tert-butyl-peroxy)-hexane, di-(2-tert-butylperoxypropyl-(2))-benzene, n-Butyl 4,4-di (tert-butylperoxy)-valerate, and 1-di (tert-butylperoxy)-3,3,5-trimethylcyclohexane, elemental sulfur, 4,4'-dithiodimorpholine, thioacetamide, thiazole, sulfenamide, dithiocarbamates, xanthates, and thiurams.

11. The process as claimed in claim 9, wherein said crosslink initiator is a combination of both an organic peroxide and a member selected from sulfur and sulfur donors.

12. The process as claimed in claim 11, wherein said organic peroxide is added first, with said sulfur or sulfur donor being added after completion of said agitating step, followed by further agitation.

13. A crosslinked asphalt composition comprising:

a) an asphalt composition; and b) a crosslinked polymer, comprising a polymer having one or more crosslinks that contain one or more residues from a crosslink co-agent, and further containing one or more residues from a crosslink initiator, and wherein said crosslinked-co-agent is a dimaleimide compound or triallyl cyanurate.

14. The composition as claimed in claim 13, wherein said polymer is a member selected from the group consisting of (co)polymers containing styrene units and/or butadiene units.

15. The composition as claimed in claim 14, wherein said polymer is a member selected from the group consisting of polymers containing polystyrene blocks and/or polybutadiene blocks.

16. The composition as claimed in claim 15, wherein said polymer is a member selected from the group consisting of SBR, SBS and BR.

17. The composition as claimed in claim 16, wherein said crosslinkable polymer is an SBS radial polymer having a weight average molecular weight of at least 150,000.

18. The composition as claimed in claim 13, wherein said crosslink co-agent is a dimaleimide compound.

19. The composition as claimed in claim 18, wherein said dimaleimide compound is phenylenedimaleimide.

20. The composition as claimed in claim 13, wherein said crosslink co-agent is triallyl cyanurate.

21. The composition as claimed in claim 13, wherein said crosslink initiator is a member selected from the group consisting of organic peroxides, sulfur and sulfur donor compounds.

22. The composition as claimed in claim 21, wherein said crosslink initiator is a member selected from the group consisting of di-(tert-butyl peroxyisopropyl)benzene, 1,5-diethyl-2,5-di-(tert-butyl-peroxy)-hexyne tert-butyl cumyl peroxide, dicumyl peroxide, 1,5-dimethyl-2,5-di (tert-butyl-peroxy)-hexane, di-(2-tert-butylperoxypropyl-(2))-benzene, n-Butyl 4,4-di (tert-butylperoxy)-valerate, and 1-di (tert-butylperoxy)-3,3,5-trimethylcyclohexane, elemental sulfur, 4,4'-dithiodimorpholine, thioacetamide, thiazole, sulfenamide, dithiocarbamates, xanthates, and thiurams.

23. The composition as claimed in claim 21, wherein said crosslink initiator is a combination of both an organic peroxide and a member selected from the group consisting of sulfur and sulfur donors.

* * * * *